Nov. 13, 1928.
E. F. W. ALEXANDERSON ET AL
1,691,423
CIRCUIT CONTROL APPARATUS
Filed May 20, 1926
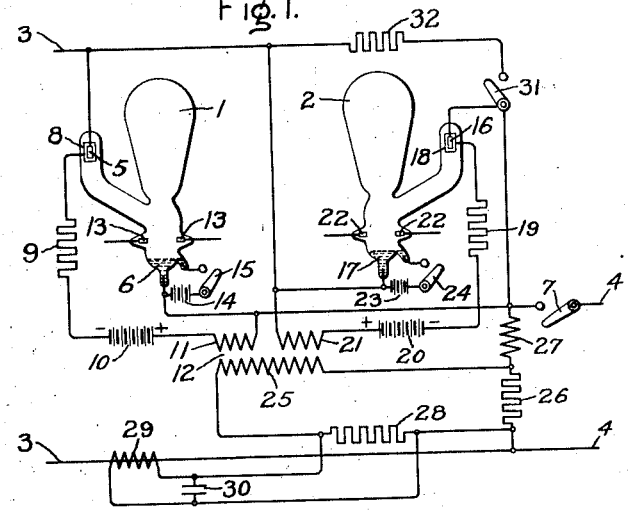
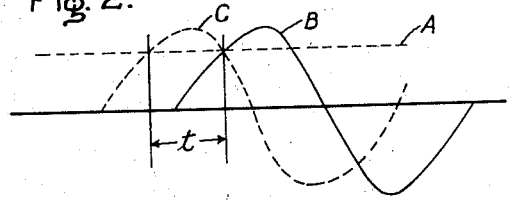
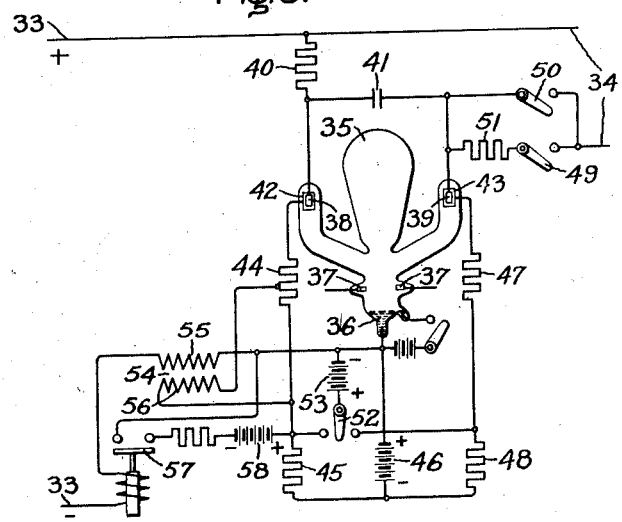
Inventors:
Ernst F. W. Alexanderson,
Albert H. Mittag
by
Their Attorney.

Patented Nov. 13, 1928.

1,691,423

UNITED STATES PATENT OFFICE.

ERNST F. W. ALEXANDERSON AND ALBERT H. MITTAG, OF SCHENECTADY, NEW YORK, ASSIGNORS TO GENERAL ELECTRIC COMPANY, A CORPORATION OF NEW YORK.

CIRCUIT-CONTROL APPARATUS.

Application filed May 20, 1926. Serial No. 110,347.

Our invention relates to apparatus for controlling the connections of electrical circuits, and has for its principal object the provision of an improved circuit control apparatus wherein means comprising an electron tube are utilized to open or close an electrical circuit discharge device.

Various arrangements wherein electron discharge devices are utilized to control the connections of a circuit have been proposed in the past. In the operation of these arrangements, it is customary to control the circuit by change in the potential of a grid provided for controlling the transmission of current between the cathode and anode of the electron discharge device. The facility with which control of the circuit is effected by this method is dependent on the grid construction and operating characteristics of the device.

It is well known that a grid interposed between the cathode and anode of a vapor electric device, such as the mercury rectifier for example, will prevent starting of the current when charged to a negative potential of sufficient magnitude but that it is incapable of stopping the current after it has once started. Likewise in the case of a low vacuum electron discharge device comprising a heated cathode, it is impossible to interrupt the current therethrough by change in the grid potential. In order to interrupt the current of such devices, it is necessary that the anode current be reduced to zero for at least an instant and that the grid potential be negative. In accordance with our invention, means operable either manually or in response to a predetermined electrical condition of the circuit to be controlled are provided for producing this relation between the anode current and grid potential of the control device.

Our invention will be better understood from the following description when considered in connection with the accompanying drawings and its scope will be pointed out in the appended claims.

Referring to the drawings, Fig. 1 shows an alternating current circuit control apparatus wherein our invention has been embodied; Fig. 2 is an explanatory diagram relating to the operation of this apparatus; and Fig. 3 shows an apparatus which is adapted to control the connections of a direct current circuit.

Fig. 1 shows electron discharge or mercury arc devices 1 and 2 which are oppositely connected between sections 3 and 4 of an alternating current circuit for transmitting current in either direction between these line sections. The device 1 is provided with an anode 5 which is connected to the line section 3, with a mercury cathode 6 which is arranged to be connected to the line section 4 through a switch 7, with a grid 8 which is connected to the cathode 6 through a resistor 9, a grid bias battery 10 and a secondary winding 11 of a transformer 12, with exciting electrodes 13 which may be connected to the cathode 6 through a suitable source of exciting current, and with a starting battery 14 and switch 15. The device 2 comprises an anode 16 connected to the line section 4, a cathode 17 connected to the line section 3, a grid 18 connected to the cathode 17 through a resistor 19 connected in series with a grid bias battery 20 and a secondary circuit 21 of the transformer 12, exciting electrodes 22, and starting battery 23 and switch 24. It will be apparent the batteries 10, 14, 20 and 23 may be replaced by other suitable sources of current. With the connections shown, the grids 8 and 18 are charged to a negative potential when no current is transmitted through the line section 3.

It will be observed that the primary circuit 25 of the transformer 12 is connected in series with resistors 26 and 28; that the resistor 26 is connected to the line section 4 in series with a high inductance reactor 27; and that the resistor 28 is connected in parallel with a capacitor 30 to the secondary circuit of a current transformer 29 which is connected in the line section 3. A switch 31 is provided for connecting the resistor 26 and reactor 27 between the conductors of the line section 3 in series with a resistor 32.

With the switch 31 in its illustrated open position, the connections between the line sections 3 and 4 are interrupted by the devices 1 and 2 for the reason that the grids 8 and 18 are maintained at negative potentials by the bias batteries 10 and 20. Upon closure of the switch 31, however, current from the line section 3 is transmitted through the resistor 26 and reactor 27 and an alternating potential which lags behind that of the circuit 3 by about 90 degrees is applied to the grids 8 and 18 through the resistor 26 and transformer 12. The effect of the alternating potential applied to the grids 8 and 18 is to neutralize the bias potentials of the grids during alternate half cycles and to alternately charge the grids 8 and 18 to a positive potential.

In Fig. 2, the negative bias potential applied to the grids 8 and 18 by the batteries 10 and 20 is represented by the line A, the potential of line section 3 is represented by the curve B and the potential applied to the grids 8 and 18 through the resistor 26 and transformer 12 is represented by the curve C. It will be observed that the resultant voltage applied to the grids is positive during the interval when the alternating potential is greater than that of the negative bias battery. Under these conditions the grids 8 and 18 are alternately charged to a positive potential and alternating current is transmitted between the line section 3 and resistor 26 through device 1 in one direction and through device 2 in the other direction. As soon as the devices 1 and 2 begin to transmit current, the switch 7 may be closed, and the switch 31 may be opened to complete the connections of circuit 4. The switch 7 is provided for preventing the application of voltage to the line section 4 through the resistor 32 and may be omitted where the application of such a potential to the line section 4 is not objectionable.

The current transmitted between the line sections 3 and 4 produces in the resistor 28 a potential drop which is opposed to that of the resistor 26. This potential is due to connection of the resistor to the section 3 through the transformer 29. As this current increases, the intervals of time during which the grids 8 and 18 are positively charged become shorter and shorter until finally the grid potential is maintained negative throughout each half cycle and the current between the line sections is interrupted in response to this change in the electrical conditions of the circuits. The particular electrical condition or value of current at which the connection between the line sections is interrupted is of course dependent on the design or adjustment of the apparatus. In order to reestablish connections between the line sections, it is necessary that the switch 31 be operated as previously set forth.

Fig. 3 shows an apparatus suitable for controlling the connections between a pair of direct current line sections 33 and 34. This apparatus comprises an electron discharge device 35 which is provided with a mercury cathode 36 with exciting anodes 37, with main anodes 38 and 39 respectively connected to line section 33 through a resistor 40 and through the resistor 40 and energy storage means shown as a condenser 41, and with grids 42 and 43. It will be noted that the grid 42 is connected to the cathode 36 through resistors 44 and 45 and a negative bias battery 46, that the grid 43 is connected to the cathode 36 through battery 46 and resistors 47 and 48, and that switches 49 and 50 are arranged to connect the anode 39 to the circuit 34 either through the resistor 51 or independently of this resistor.

With the connections as illustrated, the grids 42 and 43 are charged to a negative potential by the battery 46 and current cannot be started through the device 35 even though the connection between the anode 39 and the circuit 34 is completed. A switch 52 is arranged to connect a battery 53 between the cathode 36 and either the junction of resistors 47 and 48 for starting current through the device 35 or the junction of resistors 44 and 45 for interrupting the current of this device. The current of this device 35 may also be interrupted automatically either in response to a sudden increase in load current or to a gradual increase in load.

Interruption of the current in response to a sudden increase in load, such as occurs in case of a short circuit, is produced by a positive potential applied to the grid 42 through a transformer 54 which has its primary circuit 55 connected in the line section 33 and its secondary circuit 56 connected across a portion of the resistor 44. Interruption of the current in response to a gradual increase in current is produced by a relay switch 57 which has its operating coil connected in the line section 33 and operates to connect between the cathode 36 and the grid 42 a battery 58 whereby the potential of this grid is made positive.

Assuming the device 35 to be excited and the switches 49, 50 and 57 to be in their illustrated open positions, current is started through the device 35 by closing switch 49 and operating the switch 52 to its right hand closed position, thus causing a positive potential to be applied to the grid 43 by the source 53 and permitting the capacity means or condenser 41 to be charged to full line voltage by current supplied through the resistor 40. The switch 52 is then opened and the switch 50 is closed to shunt the current past the resistor 51. Under these conditions, the condenser 41 is charged to full line voltage, the grids 42 and 43 are negatively charged with respect to the cathode 36 and the anode 39 and the current continues for the reason that the negative potential of the grid 43 is incapable of stopping it after it has once started.

When it is desired to interrupt the current transmitted between the line sections through the device 35, the switch 52 is operated to its left hand closed position, thereby causing a positive potential to be applied to the grid 42 by the battery 53 and producing a transfer of current through the condenser 41 whereby the arc of device 35 is transferred from the anode 39 to the anode 38. When the condenser 41 is fully charged, the current of the device 35 is completely interrupted for the reason that the grid 43 is negatively charged and current through the anode 39 cannot be started again. The condenser 41 thus functions to temporarily transfer the current from the anode 39 and produce opening of the device 35. As previously indicated, the same result may be produced either by the transformer 54 which functions to apply a positive potential to the grid 42 in response to a sudden rise in the current transmitted between the line sections 33 and 34, or by the circuit control device 57 which functions to connect the source 58 to the grid 42 when the current transmitted between the line sections has increased to a predetermined value.

The embodiments of the invention illustrated and described herein have been selected for the purpose of clearly setting forth the principles involved. It will be apparent, however, that the invention is susceptible of being modified to meet the different conditions encountered in its use and we therefore aim to cover by the appended claims all modifications within the true spirit and scope of our invention.

What we claim as new and desire to secure by Letters Patent of the United States is:—

1. The combination of a plurality of power line sections, an electron discharge device provided with a cathode and anode connected between said line sections and with means comprising a grid for controlling the transmission of current between said cathode and anode, and means electrically connected between one of said line sections and said grid for causing said current to be interrupted in response to a predetermined electrical condition of said line sections.

2. The combination of a plurality of line sections, an electron discharge device provided with a cathode and anode connected between said sections and with means comprising a grid for controlling the transmission of current between said cathode and anode, means connected between said grid and cathode for applying a negative potential to said grid, and means connected between one of said circuits and said grid for applying a positive potential to said grid in response to a predetermined electrical condition of said sections.

3. The combination of a plurality of line sections, an electron discharge device provided with a cathode and anode connected between said sections and with means comprising a grid for controlling the transmission of current between said cathode and anode, means connected between said grid and cathode for applying a negative potential to said grid, and a current transformer connected to one of said sections and arranged to apply between said cathode and grid a positive potential having its value determined by the current transmitted between said sections.

4. The combination of a plurality of line sections, an electron discharge device provided with a cathode and anodes connected between said sections and with grids for controlling the transmission of current between said cathode and anodes, energy storage means connected between said anodes, means for applying a negative potential to said grids, and means operable to apply a positive potential to one of said grids for initiating the transmission of current between said sections through one of said anodes and to apply a positive potential to another of said grids for interrupting said current by diverting it to another of said anodes through said storage means.

5. The combination of a plurality of line sections, an electron discharge device provided with a cathode and anodes connected between said sections and with grids for controlling the transmission of current between said cathode and anodes, capacity means connected between said anodes, means connected between said cathode and grids for applying a negative potential to said grids, and means operable to apply a positive potential to one of said grids for initiating the transmission of current between said sections through one of said anodes and to apply a positive potential to another of said grids for interrupting said current by diverting it to another of said anodes through said capacity means.

6. The combination of a plurality of line sections, an electron discharge device provided with a cathode and anodes connected between said sections and with grids for controlling the transmission of current between said cathode and anodes, capacity means connected between said anodes, means connected between said cathode and grids for applying a negative potential to said grids, and means operable in response to change in an electrical condition of said sections for applying to one of said grids a positive potential whereby the current of said sections is diverted from one of said anodes through said capacity means to another of said anodes.

7. The combination of a plurality of line sections, an electron discharge device provided with a cathode and anodes connected between said sections and with grids for controlling the transmission of current between said cathode and anodes, capacity means connected between said anodes, means connected between said cathode and grids for applying a negative potential to said grids and means comprising a current transformer connected in one of said sections for applying to one of said grids a potential whereby the current of said sections is diverted from one of said anodes through said capacity means to another of said anodes in response to a predetermined electrical condition of one of said sections.

8. The combination of a plurality of conductors, an electron discharge device provided with a cathode and anodes connected between said conductors and with grids for controlling the transmission of current between said cathode and anodes, capacity means connected between said anodes, means connected between said cathode and grids for applying a negative potential to said grids, and means comprising a circuit control device having its operating coil connected to one of said conductors for applying to one of said grids a potential whereby the current of said conductors is diverted from one of said anodes through said capacity means to another of said anodes.

9. The combination of a direct current circuit, a vapor electric device provided with a cathode and anodes connected in said circuit and with a grid for controlling the starting of current between said cathode and anode, and means operable to divert said current from said anode and cause interruption of said circuit.

10. The combination of a direct current circuit, a vapor electric device provided with a cathode and anode connected in said circuit and with a grid for controlling the starting of current between said cathode and anode, and means including an energy storage element for diverting said current from said anode and causing said circuit to be interrupted.

In witness whereof, we have hereunto set our hands this 18th day of May, 1926.

ERNST F. W. ALEXANDERSON.
ALBERT H. MITTAG.